(No Model.)
A. C. WOOD.
Valve.
No. 227,943. Patented May 25, 1880.
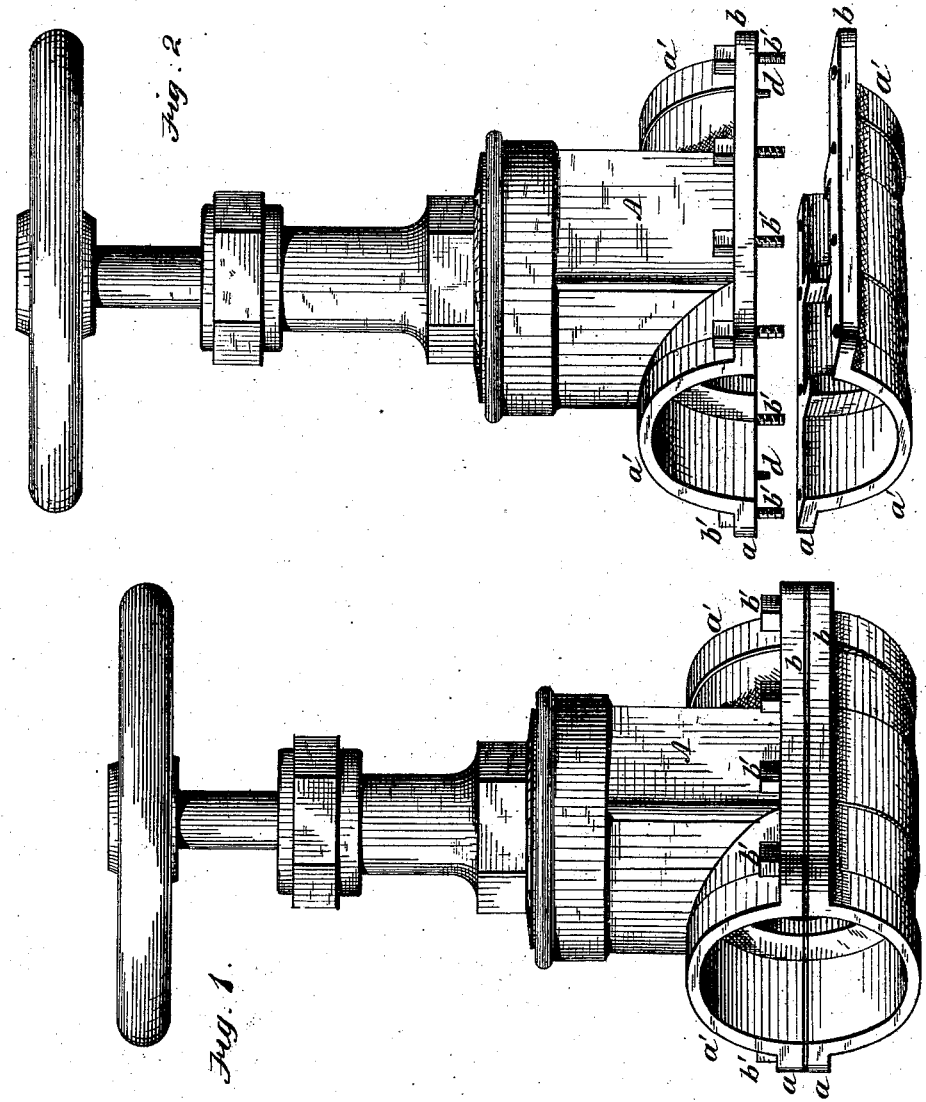

UNITED STATES PATENT OFFICE.

AUSTIN C. WOOD, OF SYRACUSE, NEW YORK.

VALVE.

SPECIFICATION forming part of Letters Patent No. 227,943, dated May 25, 1880.

Application filed March 5, 1880. (No model.)

*To all whom it may concern:*

Be it known that I, AUSTIN C. WOOD, of Syracuse, Onondaga county, New York, have invented an Improvement in Valves, of which the following is a specification, reference being had to the accompanying drawings, in which—

Figure 1 is a perspective view, and Fig. 2 is a like view with the parts detached, which together make the body of the valve.

My invention consists in dividing the body of the valve into two or more sections, each provided with projecting lips or flanges on both sides on a radial line, and with bolt-holes and bolts passing through the flanges to fasten them together, or by a flange-hinge on one side, and bolts, catches, or equivalent devices on the other, or by screw-gripes around the ends.

The object of it is to so construct the valve-body that it can be easily attached to a continuous line of pipe in a trench or building in such a manner as to make a large saving in labor and material over the usual or customary method of making such an attachment.

It is constructed as follows: A is the body of the valve, with the ordinary hubs $a'$ upon the ends. This body is made in two or more longitudinal sections, each of which is provided with lips or flanges $a$ $b$, projecting outwardly on both sides on radial lines. These sections are held together by bolts $b'$ passing through holes in the flanges, or by a hinge on one side and bolts $b'$ on the other. In the drawings bolts $b'$ are shown on both sides.

Dowel-pieces $d$ $d$ can be used to guide the sections and bring them squarely together for the insertion of the bolts.

The interior of the body A is constructed in the usual manner, with a valve-seat, and shoulders on each side of it, against which the ends of the pipe rest.

In use, after simply cutting out of the pipe to which it is proposed to attach the valve a piece of the same length as the space between the outer sides of the valve-seat shoulders, the lower section of the body A is placed in position under the opening cut in the pipe, the upper section put on over it, the dowel-pins guiding it to its place, and the sections are drawn together around the pipe tightly and in such a manner that the valve-gate when operated will pass through the space cut out of the pipe.

An elastic or other packing may be used between the inner ends of the sections and the pipe and between the flanges, if desired.

The drawings show the valve-gate and its operating device mounted in the usual manner upon the upper section of the body.

I am aware that a jointed sleeve to put around a pipe to stop a leak or make a joint, and also to inclose the pipe as a part of a pipe-cutting device, has been used; but I am not aware that it has ever been applied to valves as and for the purposes described.

Having thus described my invention, I claim—

A stop-valve consisting of two sections, one carrying the valve or gate and its operating screw-stem, and each having coincident parts, forming when joined the valve or gate seat, said sections having diameter-flanges $a$ $b$ and semicircular end hubs, $a'$, which, when joined and secured to a pipe, take the place of a cut-out portion thereof, and, inclosing the cut ends, form a continuation of the cut pipe, with the valve-gate operating in the space cut out of the pipe, whereby a stop-valve is made a part of a continuous line of pipe, as shown and specified.

In witness whereof I have hereunto set my hand this 21st day of January, 1880.

AUSTIN C. WOOD.

Witnesses:
 L. W. MYERS,
 C. W. SMITH.